United States Patent [19]

Hanciulescu et al.

[11] 3,998,096
[45] Dec. 21, 1976

[54] SUBSURFACE DIFFERENTIAL PRESSURE RECORDER

[75] Inventors: Valentin Eugen Hanciulescu; Dumitru Milos; Costel Serban; Ion Lazar; Stefan Fanica, all of Cimpina, Romania

[73] Assignee: Institutul de Cercetari si Proiectari Pentru Petrol si Gaze, Cimpina, Romania

[22] Filed: Aug. 8, 1975

[21] Appl. No.: 603,144

[52] U.S. Cl. .............................................. 73/151
[51] Int. Cl.[2] ...................................... E21B 47/06
[58] Field of Search .................. 73/152, 151, 391

[56] References Cited
UNITED STATES PATENTS

| | | | |
|---|---|---|---|
| 2,816,440 | 12/1957 | Garrison | 73/151 |
| 2,942,462 | 6/1960 | Buck | 73/152 |
| 3,318,145 | 5/1967 | Lynn et al. | 73/152 |

*Primary Examiner*—Jerry W. Myracle

[57] ABSTRACT

The invention involves a device for recording pressure variations which are small with respect to the absolute pressure value in a bore hole which produces fluids under pressure from a hydrocarbon formation, based on measured differential pressure. The device uses a helical spring for the pressure sensing element and a piston rotated by a clock through the medium of a fork and two rollers provided on the stylus which is integral with the piston. The pressure difference arising between a recording chamber and the helical spring chamber causes the piston to move axially. The device is characterized by having a valve providing pressure equalization between the recording chamber and the bore hole, the opening of said valve being controlled by a clock which rotates a rod upon which a member is threadedly fitted so as to hold the valve open for a predetermined time.

9 Claims, 1 Drawing Figure

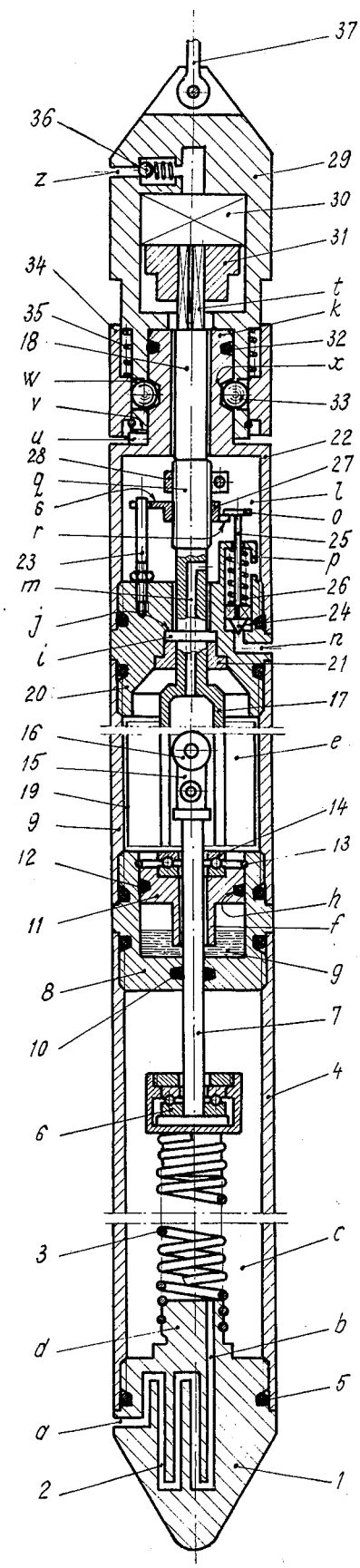

SUBSURFACE DIFFERENTIAL PRESSURE RECORDER

The present invention relates to a device for recording pressure variations that are small with respect to the absolute pressure in a well bore producing fluids under pressure from a hydrocarbon formation.

Prior existing devices for measuring and recording absolute pressures in a well bore involve a clock connected to a chamber containing a helical spring attached to a piston through the medium of an axial roller bearing, said piston being axially movable under the influence of the well bore pressure and rotatably actuated by the clock through a slidable coupling, the well bore fluids being admitted to the interior of the device through a baffle system located at the lower end of the spring.

A disadvantage of these devices is that small pressure variations with respect to the absolute pressure are not accurately recorded.

There are also devices for measuring the differential pressures in the well bore which can measure small pressure variations with respect to the absolute pressure. They include a clock rotating a shaft carrying a helical spring, a piston attached thereto being rotated by the clock and at the same time being moved axially under the influence of the well bore pressure. The interior of said device is divided into two chambers, one to receive the helical spring and the other to receive the recording assembly; a seal between the chambers enables the piston to pass from one chamber to the other. In addition, two valves are provided, one of which is used to introduce gas, at the surface, into the recording chamber; through the other valve the well bore pressure may enter the helical spring chamber.

These devices have the disadvantage that the pressure of the gas introduced from the surface into the recording chamber will change as a result of temperature variations in the well bore and of the gas leaking past the piston seal from the recording chamber to the spring chamber; for this reason the measurements are unreliable, the physical and other properties of the reservoir being likely to be miscalculated.

In the present invention all these disadvantages are eliminated in that it can be used for dependable measurement of small pressure variations with respect to the absolute well bore pressure. The device comprises a means provided with an outlet closed by a valve contained in a chamber enclosed in a cylinder connected by means of a detachable coupling to the clock case, the opening of said valve for pressure equalization between the recording chamber and the well bore being controlled by said clock. The recording chamber at its lower end is in threaded connection with nipple means in which a plate with a tube is mounted, so that a piston can move therethrough, with the space between the tube plate and the nipple being filled with oil to prevent the pressurized gas in the recording chamber from entering the spring chamber. An O-ring provided outside on the tube plate together with the tube prevent the oil from entering the recording chamber when the device is in horizontal position. An axial ball bearing located on said plate allows free rotation of the piston when the pressure in the recording chamber is higher than the pressure in the spring chamber. In addition, the nipple provided with the outlet carries a guide rod of adjustable height used to prevent rotation of a slidable nut, the latter being provided with a loop which may be slipped over the guiding rod and with a spur which, during the upward movement caused by a threaded rod rotated by the clock, the nut being slidably mounted on said threaded rod, raises the end disc of a rod controlling valve opening and closing, whereby the end disc is released and therewith the valve closed when the loop slips off the guide rod and the sliding nut engages a bridle provided on the threaded rod being now free to rotate therewith.

An example of an illustrative embodiment of the invention is described in conjunction with the accompanying figure of the drawing showing a vertical longitudinal section of the device.

In a preferred embodiment, this invention comprises the lower head 1 containing a baffle system 2 in communication through a port $a$ with the fluid in the well bore and through port $b$ with a chamber $c$, a helical spring 3 being provided therein as a pressure sensing element. A cylindrical body 4 forming the chamber $c$ is connected to the lower head 1. The connection between the lower head 1 and the cylindrical body 4 is sealed by an O-ring 5. The helical spring 3 is attached at its lower end of central pin $d$ of the lower head 1 and at its upper end to a piston 7 through the medium of an axial roller bearing 6. By means of nipple 8 the cylindrical body 4 is connected to a cylindrical body 9 enclosing a recording chamber $e$. An O-ring 10 mounted on piston 7 in nipple 8 is used as a sealing member between chamber $c$ and the recording chamber $e$; further O-rings secured on nipple 8 seal chambers $c$ and $e$ against outside pressure. Nipple 8 contains a plate 11 supporting a tube $f$ arranged so as to allow the piston 7 to move therethrough. Between plate 11 and nipple 8 a chamber $q$ is formed which is filled from the surface with oil. To prevent the oil entering the recording chamber $e$ when the device is in horizontal position, an O-ring 12 is secured in groove $h$ on the outside of plate 11. The plate 11 is secured in place in nipple 8 by means of a notch ring 13. The plate 11 carries an axial ball bearing 14, which allows free rotation of piston 7 in the early stage of measuring operations, when the pressure in the recording chamber $e$ is much higher than the pressure in chamber $c$, whereby the piston 7 is pressed downwards. A stylus 15 is fixed at one end of the piston 7, said stylus being fitted with two rollers 16 slidably mounted within a fork 17 carried by rod 18. A chart 19 is provided in the recording chamber $e$, for the stylus 15 to record thereon the variation in pressure with respect to time.

The cylindrical body 9 is closed at its upper end by a nipple 20, through which rod 18 may move. The rod 18 has a shoulder $i$ located so as to prevent the axial movement of the rotatable rod. Said shoulder $i$ rests with its upper face against a nose $j$ formed by nipple 20 and with its lower face against a sleeve 21 secured on the nipple.

The nipple 20 is connected at its other end to another cylindrical body ending in the neck $k$ after forming a chamber $l$. Two O-rings seal chamber $l$ and recording chamber $e$ against outside pressure. Chamber $l$ is in communication with the recording chamber $e$ through a channel $m$ located in rod 18. Nipple 20 carries a guide rod 23 of adjustable length. Chamber $l$ has a port $n$ disposed in nipple 20, the port $n$ being closed by a valve 24 integral with the rod 25 which carries an end disc $o$. The rod 25 is guided by an arm $p$ of nipple 20. The valve 24 is held in closed position by spring 26.

The rod 18, above channel m, is fitted with thread q so that the nut 27 can move thereon. Said nut 27 carries both a spur r, designed to engage under the end disc, and a loop s slidable along rod 23. Above the nut 27 on thread q a bridle 28 is positioned so as to stop nut 27 after guide rod 23 has released the loop s. A case 29 containing a clock 30 is mounted on neck k of the cylindrical body 22. The rotation of the clock 30 is transmitted to rod 18 through the medium of a spline coupling 31 with a driven part having a recess drivingly to receive the head t of rod 18, rod 18 having a longitudinal land thereon. Rotation of the neck k relative to clock case 29 is prevented by a pin u located on the lower side of neck k, said pin engaging a bore v on the edge of clock case 29. An O-ring 32 secured on neck k seals off the clock case 29. A series of bores w are provided inside case 29 around its circumference, while a circular groove x lies opposite thereto on neck k to receive the balls 33 of a detachable coupling so that when clock case 29 is coupled with neck k, the balls are pressed inside the bores w and the circular groove x by a sleeve 34 having an inner rim y, said sleeve being held in closed position by spring 35. The clock case 29 has an inlet z through which gas is pumped into clock case 29, chamber l and recording chamber e. A check valve 36 prevents gas from flowing out.

The device is run into the well bore on a wire line 37 fastened to the upper end of the clock case 29.

Prior to running the device into the well bore, the slidable nut 27 should be pressed down until spur r comes under the end disc o, whereby the loop s is slipped over the guide rod 23; the distance between spur r and end disc o should be set according to the time when valve 24 should open port n. After winding up the clock and locking clock case 29 in position on neck k, as described above, gas must be pumped through inlet z under a pressure higher than the pressure measured in the well bore. While the clock is in operation and the device is being run to the desired depth in the bore hole, the rod 18 is continuously rotated, with the rotating movement being transmitted through fork 17 and rollers 16 to piston 7. At the same time the nut 27 rises on thread q until spur r reaches the end disc, thereby opening valve 24 so that the well bore fluid surrounding the device has free access to chamber l and recording chamber e. The gas previously filled through inlet z will now flow out for pressure equalization between recording chamber e and bore hole at the particular depth. The rod 18 goes on rotating whereby the loop s comes off the rod 23, the nut 27 contacts the bridle 28 and releases the end disc o. In this way the valve 24, after the pressure equalization is accomplished, closes port n. Now any variation in pressure occurring in the well bore will be recorded on the chart 19 owing to the communication between the well bore and chamber o through inlets a, b and the baffle 2. With the device thus exposed to well bore influence, the clock through axial roller bearing 6 enables piston 7 to rotate freely while said piston also moves axially under the influence of the forces arising from the pressure differential between chambers c and e and the force of the helical spring 3.

The oil filling chamber g serves to avoid contact between the pressurized gas in the recording chamber e and the O-ring 10, whereby gas leakage into chamber c is impossible; this is very important considering that chamber c was filled with a fluid under a pressure lower than the pressure in the recording chamber e.

Among the advantages of the disclosure are:

small pressure variations of the well bore fluid are accurately recorded;

reliability is designed into the device;

by changing the spring range the device can be used for a wide pressure range;

the device can be used for both increasing and decreasing pressure variations;

it is not necessary to know the accurate value of the flowing pressure in the well bore.

Although the invention is illustrated and described with reference to a single preferred embodiment thereof, it is to be expressly understood that it is in no way limited to the disclosure of such a preferred embodiment, but is capable of numerous modifications within the scope of the appended claims.

What is claimed is:

1. In a device for measuring pressure variations in a well bore which are small with respect to the absolute pressure in the well bore, the device having an elongated tubular casing adapted to be lowered into the well bore, the casing having a first, lower chamber, a port in the lower chamber providing communication between it and the well bore, a second, recording chamber disposed above the first chamber in the casing, a partition between the first and second chambers, a piston in the form of a rod extending lengthwise of the casing through the partition and having its opposite ends disposed respectively in the first and second chambers, means sealing the piston to the partition while permitting the piston to reciprocate with respect thereto, the piston moving axially under the influence of pressure differentials arising between the first and second chambers, yieldable means disposed in the first chamber and acting between the lower end of the piston and the lower end of the casing, a stylus mounted on the upper end of the piston within the second chamber to reciprocate with the piston, means holding a chart within the second chamber for cooperation with the stylus, a clock for rotating the stylus and chart relative to each other, and means to introduce gas, at the surface, into the second chamber, the improvement which comprises valve means for selectively connecting the second chamber to the well bore to equalize the pressure therebetween and for disconnecting the second chamber from the well bore, and means controlled by the clock for opening the valve and thereafter closing the valve after said equalization of pressure.

2. A device according to claim 1, wherein the yieldable means is a helical spring, and the helical spring is tensioned and elongated when the pressure inside the first chamber is higher than the pressure in the second chamber, and the helical spring is compressed and shortened when the pressure in the first chamber is lower than that in the second chamber.

3. A device according to claim 1, wherein the clock is connected to rotate the piston, and comprising means providing a spring seat at the upper end of the spring, and a bearing disposed between the spring seat and the lower end of the piston to permit relative rotation between such parts.

4. A device according to claim 1, wherein the partition between the first and second chambers provides an oil-pool seal between the partition and the piston, and sealing means to prevent leakage of oil from the oil-pool when the device is turned from its normal vertical orientation.

5. A device according to claim 1, comprising a rotatable shaft within the upper end of the casing coaxial with the piston, means connecting the shaft to the clock, and a coupling between the lower part of the shaft and the upper part of the piston, the coupling being so constructed and arranged as to drive the piston by the shaft in its rotary movement and simultaneously to permit a free axial movement of the piston relative to the shaft.

6. A device according to claim 5, comprising a separate case mounted on the upper end of the casing proper, said separate case housing the clock, a splined connection between the clock and the axial shaft, and a disengageable coupling between the separate case and the upper end of the casing proper.

7. A device according to claim 1, comprising means providing a third, upper chamber therein above the second chamber in the casing, a transverse valve-supporting member disposed between the second and the third chambers, and conduit means providing communication between the second and third chambers.

8. A device according to claim 7, wherein the axial shaft extends through the third chamber, and the axial shaft has a threaded portion within the third chamber, a nut having threaded engagement with the threaded portion of the axial rod so as to be adjustable therealong, the nut having a lateral extension thereon with guide means at its outer end, a vertical rod mounted on the transverse valve-supporting member and engaging the guide means on the nut to keep it from turning with the axial shaft, and means actuated by travel of the nut along the axial shaft in one direction to open the valve.

9. A device according to claim 8, wherein the valve is constantly urged toward valve-closed position, and the means actuated by travel of the nut along the axial shaft in one direction to open the valve releases the valve thereby to close it after a predetermined further amount of travel of the valve-opening means.

* * * * *